United States Patent
Usie

(10) Patent No.: US 9,934,664 B2
(45) Date of Patent: Apr. 3, 2018

(54) NETWORK CAMERA HAVING A PLURALITY OF DIGITAL OUTPUT TERMINALS FOR OUTPUTTING ALARM AND CONTROL METHOD THEREOF

(71) Applicant: CHeKT LLC, Shreveport, LA (US)

(72) Inventor: Wesley Robert Usie, Shreveport, LA (US)

(73) Assignee: CHEKT LLC., Shreveport, LA (US)

( * ) Notice: Subject to any disclaimer, the term of this patent is extended or adjusted under 35 U.S.C. 154(b) by 13 days.

(21) Appl. No.: 15/203,351

(22) Filed: Jul. 6, 2016

(65) Prior Publication Data
US 2018/0012464 A1 Jan. 11, 2018

(51) Int. Cl.
G08B 13/196 (2006.01)
G06K 9/00 (2006.01)
H04N 5/232 (2006.01)
G06T 7/20 (2017.01)

(52) U.S. Cl.
CPC ... *G08B 13/19695* (2013.01); *G06K 9/00362* (2013.01); *G06T 7/20* (2013.01); *H04N 5/23206* (2013.01)

(58) Field of Classification Search
CPC ......... H04N 5/23206; G08B 13/19695; G06K 9/00362
See application file for complete search history.

(56) References Cited

U.S. PATENT DOCUMENTS

2005/0200494 A1* 9/2005 Herrmann ........ G08B 13/19619
340/693.5
2012/0307066 A1* 12/2012 De Ieso ........... G08B 13/19602
348/152

* cited by examiner

*Primary Examiner* — Christopher K Peterson
(74) *Attorney, Agent, or Firm* — Lucern, PC; Heedong Chae

(57) ABSTRACT

The present invention provides a network camera having a plurality of digital output terminals for outputting an alarm, and a method of controlling the network camera. That is, the present invention includes a plurality of digital output terminals for transmitting image information obtained through a wireless communication network to a server and transmitting information about sensing a person and information about a problematic situation, respectively, using a 4-wire cable, so it is possible to check whether it is a normally-closed state or a normally-open state through the plurality of digital output terminals that are individually managed, respectively, and accordingly, it is possible to improve convenience in use.

6 Claims, 3 Drawing Sheets

NETWORK CAMERA HAVING A PLURALITY OF DIGITAL OUTPUT TERMINALS FOR OUTPUTTING ALARM AND CONTROL METHOD THEREOF

BACKGROUND OF THE INVENTION

1. Field of the Invention

The present invention relates to a network camera having a plurality of digital output terminals for outputting an alarm and a control method thereof, and particularly, to a network camera that includes a plurality of digital output terminals for transmitting image information obtained through a wireless communication network to a server and transmitting information about sensing a person and information about a problematic situation using a 4-wire cable, respectively, in order to output an alarm, and a method of controlling the network camera.

2. Description of the Related Art

A PIR (Passive Infrared) motion sensor senses a human body in the area where it is installed, and transmits corresponding sensing information to an alarm panel when sensing a human body.

The PIR motion sensor and the alarm panel are connected through a 4-wire cable including a power line, a ground line, a digital output line, and a digital ground line.

When the PIR motion sensor and a camera for sensing images are both installed, there are problems in that the costs are increased and the efficiency of operating the facility is deteriorated.

Further, it is difficult to find out from the alarm panel that power for the PIR motion, sensor has been shut down.

PRIOR ART DOCUMENT

[Patent Document] Korean Patent Registration No. 10-0781577 (titled "PIR sensor based indoor location detection system for smart home").

SUMMARY OF THE INVENTION

An object of the present invention is to provide a network camera that includes a plurality of digital output terminals for transmitting image information obtained through a wireless communication network to a server and transmitting information about sensing a person and information about a problematic situation, respectively, using a 4-wire cable in order to output an alarm, and a method of controlling the network camera.

Another object of the preset invention is to provide a network camera having a plurality of digital output terminals for outputting an alarm that sets a digital ground line of a 4-wire cable as a digital output line for outputting information about a problematic situation, and a method of controlling the network camera.

According to an aspect of the present invention, a method of controlling a network camera having a plurality of digital output terminals for outputting an alarm, includes: acquiring image information about an area where the network camera is installed, by means of a photographing unit; sensing a predetermined event by means of a sensor unit; transmitting the image information acquired by the photographing unit to a server through a wireless communication network by means of a communication unit; and performing control, when the network camera is turned on, not to output a predetermined first alarm signal through a first digital output terminal in an I/O unit operated in a normally-closed, state and not to output a predetermined second alarm signal through a second digital output terminal in the I/O unit operated in a normally-closed state, by means of a control unit.

The predetermined event may include at least one of a case when there is a network loss, an SD card provided in the network camera is not recognized, the network camera is operated for predetermined functions, power for the network camera is shut down, and the photographing unit takes no image, and a case when the same image is acquired in the same way for a predetermined or more time by the photographing unit.

The method may further include: checking whether there is a person sensed in the image information obtained by the photographing unit, by means of the control unit; and controlling to output the predetermined first alarm signal through the first digital output terminal by means of the control unit, when there is a person sensed in the image information obtained by the photographing unit, as the result of checking.

The method may further include: determining whether the predetermined event has been sensed by the sensor unit, by means of the control unit; and controlling to output the predetermined second alarm signal through the second digital output terminal by means of the control unit, when the predetermined event has been sensed by the sensor unit, as the result of determining.

According to another aspect of the present invention, a network camera having a plurality of digital output terminals for outputting an alarm, includes: a photographing unit acquiring image information about an area where the network camera is installed; a sensor unit sensing a predetermined event; a communication unit transmitting the image information obtained by the photographing unit to a server through a wireless communication network; an I/O unit connected to a 4-wire cable and including a power terminal, a ground terminal, a first digital output terminal, and a second digital output terminal; and a control unit, when the network camera is turned on, performing control not to output a predetermined first alarm signal through the first digital output terminal operated in a normally-closed state and not to output a predetermined second alarm signal through a second digital output terminal operated in a normally-closed state in the I/O unit.

The first digital output terminal may be controlled by the control unit to output the predetermined first alarm signal, when there is a person sensed in the image information obtained by the photographing unit.

The second digital output terminal may output the predetermined second alarm signal when the network camera is turned off, and may be controlled to output the predetermined second alarm signal by the control of the control unit when the predetermined event has been sensed by the sensor unit.

Since the present invention includes a plurality of digital output terminals for transmitting image information obtained through a wireless communication network to a server and transmitting information about sensing a person and information about a problematic situation, respectively, using a 4-wire cable, it is possible to reuse common 4-wire cables in the related art. Further, since it is possible to simultaneously sense a person and an event according to a problematic situation from image information using one network camera, it is possible to reduce the costs and improve operation efficiency. Furthermore, it is possible to achieve the functions of common motion sensors in the related art without integrating an alarm panel with additional hardware/software using the same number of wires for the common motion sensors, so workers who have installed the common motion sensors can install a camera without specific training.

Further, according to the present invention, the digital ground line of a 4-wire cable is set as a digital output line for outputting information about problematic situations, so it is possible to reduce the costs for training workers who install a camera and for managing the equipment at a remote place. Further, since the type of using four wires for common motion sensors in the related art is available without a change, so it is possible to reduce the entry barrier to the alarm monitoring market of network cameras.

DETAILED DESCRIPTION OF THE PREFERRED EMBODIMENTS

Figure 1:
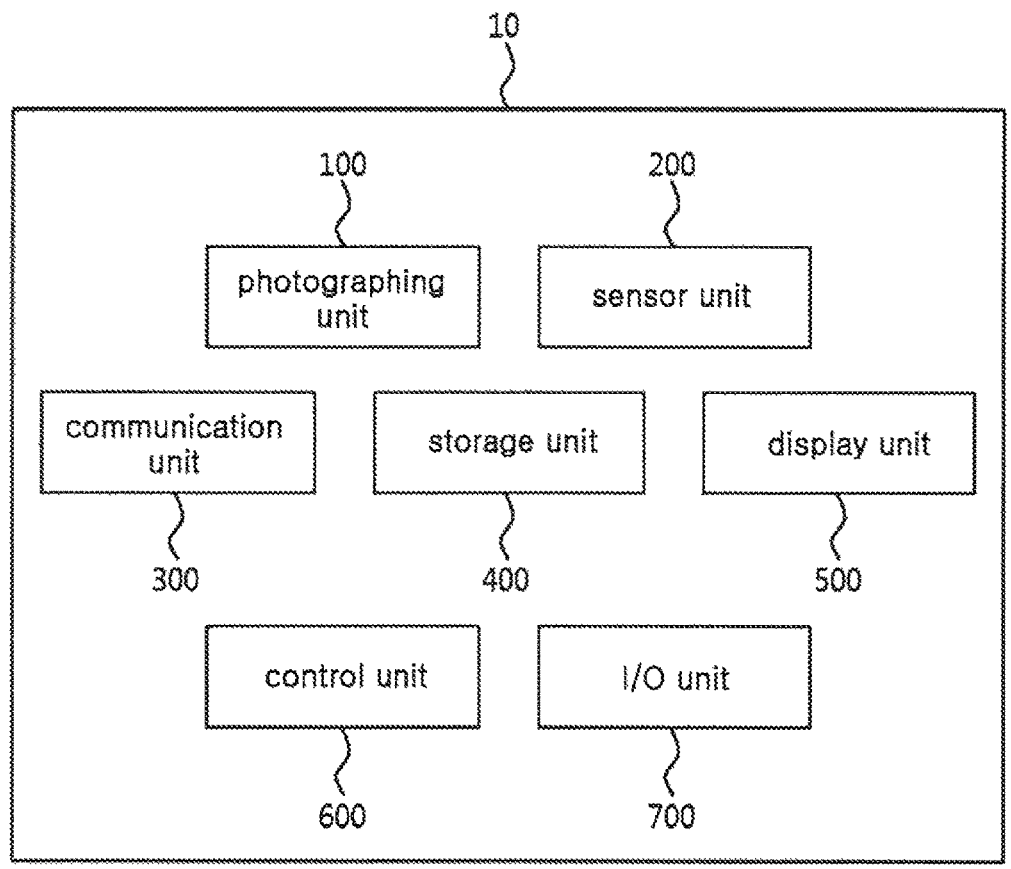
FIG. 1 is a block diagram illustrating the configuration of a network camera having a plurality of digital output terminals for outputting an alarm according to an embodiment of the present invention.

It should be noted that technical terms used herein are used only in order to describe specific embodiments rather than limiting the present invention. Further, the technical terminologies used here should be construed as being generally understood by those skilled in the art unless defined as specific meanings, not construed as being excessively general meanings or excessively narrow meanings. Further, if the technical terminologies used herein are wrong technical terminologies that cannot exactly express the spirit of the present invention, they should be replaced by technical terminologies that can be correctly understood by those skilled in the art. Further, common terms used herein should be construed in accordance with dictionary definitions or contexts, not being as excessively narrow meanings.

The singular forms used herein are intended to include the plural forms as well, unless the context clearly indicates otherwise. Terms "composed of" or "include" used herein should not construed as necessarily including all of various components or various steps, but construed that they may not include some of the components or steps or may further include additional components or steps.

Further, terms including ordinal numbers such as 'first' and 'second' may be used to describe various components, but the components are not to be construed as being limited to the terms. The terms are used to distinguish one component from another component. For example, the 'first' component may be named the 'second' component, and vice versa, without departing from the scope of the present invention.

Hereinafter, embodiments of the present invention will be described in detail with reference to the accompanying drawings, like reference numerals are given to like or similar components regardless of the figure numbers, and repeated description is not provided.

Further, in describing the present invention, detailed descriptions of well-known technologies will be omitted so as not to obscure the description of the present invention with unnecessary detail. Further, it should be noted that the accompanying drawings are provided only for easier understanding of the spirit of the present invention and should not be construed as limiting the spirit of the present invention.

FIG. 1 is a block diagram illustrating the configuration of a network camera 10 having a plurality of digital output terminals for outputting an alarm according to an embodiment of the present invention.

As illustrated in FIG. 1, a network camera 10 having a plurality of digital output terminals for outputting an alarm includes a photographing unit 100, a sensor unit 200, a communication unit 300, a storage unit 400, a display unit 500, a control unit 600 and an I/O unit 700. The components of the network camera 10 illustrated in FIG. 1 are not all necessary components, and the network camera 10 may be composed of components much or less than the components illustrated in FIG. 1.

The photographing unit 100 may be an IP camera/IP encoder.

Further, the photographing unit 100 processes image frames such as still, images or moving images obtained by an image sensor (a camera module or a camera) in a video call, mode, a photographing mode, a video conference mode, and the like. That is, the photographing unit 100 encodes/decodes corresponding image data obtained by the image sensor through each codec to meet standards. The processed image frames may be displayed on the display unit 500 by the control of the control unit 600. For example, the photographing unit 100 takes image of an object (or a subject) (a user image or an image conferee) and outputs a video signal corresponding to the obtained image (image of the subject).

Further, the image frames processed by the photographing unit 100 may be kept in the storage unit 400 or may be transmitted to an external terminal (for example, another terminal, an alarm panel, a server, or the like) through the communication unit 300.

As described above, the photographing unit 100 acquires (or photographs) image information about the area (or region) where the network camera 10 is installed.

The sensor unit 200 senses predetermined events (or trouble events) including a case when there is a network loss, an SD card provided in the network camera is not recognized, the network camera 10 is operated for a predetermined/specific function, power for the network camera 10 is shut down, and the photographing unit 100 takes no image, and a case when the same image is acquired (or inputted) in the same way for a predetermined or more time by the photographing unit 100.

The communication unit 300 is connected for communication to a predetermined internal component or at least one predetermined external terminal through a wire/wireless communication network. In this case, the predetermined external terminal may include a terminal (not illustrated), an alarm panel, or a server (or a center). The wireless internet technology may be WLAN (Wireless LAN), DLNA (Digital Living Network Alliance), Wibro (Wireless Broadband), Wimax (World Interoperability for Microwave Access), HSDP& (High Speed Downlink Packet Access), HSUPA (High Speed Uplink Packet Access), IEEE 802.16, LTE (Long Term Evolution), LTE-A (Long Term Evolution- Advanced), and WMBS (Wireless Mobile Broadband Service WMBS). The communication unit 300 transmits/receives data in accordance with at least one wireless internet technology within a range including even internet technologies not stated above. Further, a local communication technology may include Bluetooth, RFID (Radio Frequency Identification), IrDA (Infrared Data Association), UWB (Ultra-Wideband), ZigBee, NFC (Hear Field Communication), USC (Ultra Sound Communication), VLC (Visible Light Communication), Wi-Fi, Wi-Fi Direct, and the like. Further, a wire communication technology may include PLC (Power Line Communication), USE communication, Ethernet, serial communication, and optical/coaxial cable communication.

Further, the communication unit 300 can mutually transmit information with a predetermined terminal though a USB (Universal Serial Bus).

Further, the communication unit 300 transmits/receives wireless signals with a station, the terminal, the alarm panel, the server, and the like, on a mobile communication network constructed in accordance with technical standards or communication types (for example, GSM (Global System for Mobile communication), CDMA (Code Division Multi Access), CDMA2000 (Code Division Multi Access 2000), EV-DO (Enhanced Voice-Data Optimized or Enhanced Voice-Data Only), WCDMA (Wideband CDMA), HSDPA (High Speed Downlink Packet Access), HSUPA (High Speed Uplink Packet Access), LTE (Long Term Evolution), and LTE-A (Long Term Evolution-Advanced)) for a mobile communication.

Further, the communication unit 300 is controlled by the control unit 600 to transmit the image information obtained by the photographing unit 100 to the server (or center) 30 in a wireless communication type.

The storage unit 400 keeps various UIs (User Interface), GUIs (Graphic User Interface), and the like.

Further, the storage unit 400 keeps data, programs, and the like, required for operating the network camera 10.

That is, the storage unit 400 can keep many application programs (or applications), which are executed in the network camera 10, and data and commands for operating the network camera 10. At least, some of the application programs may be downloaded from an external server through wireless communication. Meanwhile, the application programs may be kept in the storage unit 400, installed in the network camera 10, and executed by the control unit 600 to operate the network camera 10 (or perform the functions of the network camera 10).

Further, the storage unit 400 may include at least one storage medium of a flash memory type, a hard disk type, a multimedia card micro type, a card type memory (for example, an SD or XD memory), a magnetic memory, a magnetic disc, an optical disc, a RAM (Random Access Memory), an SRAM (Static Random Access Memory), a ROM (Read-Only Memory), an EEPROM (Electrically Erasable Programmable Read-only Memory), and a PROM (Programmable Read-Only Memory). Further, the network camera 10 may manage a web storage for performing the storing function of the storage unit 400 on the internet, or may be operated in connection with the web storage.

Further, the storage unit 400 is controlled by the control unit 600 to keep the image information obtained by the photographing unit 100, sensing information sensed by the sensor unit 200, and the like.

The display unit 500 can be controlled by the control unit 600 to display various contents such as various menu images, using a user interface and/or a graphic user interface stored in the storage unit 400. Herein, the contents that are displayed on the display unit 500 include various texts or image data (including various information data) and icons, and a menu screen including data, such as a list menu and a combo box. Further, the display unit 500 may be a touch screen.

The display unit 500 may include at least one of an LCD (Liquid Crystal Display), a TFT LCD (Thin Film Transistor-Liquid Crystal Display), an OLED (Organic Light-Emitting Diode), a flexible display, a 3D Display, an e-ink display, and an LED (Light Emitting Diode).

Further, the display unit 500 is controlled by the control unit 300 to display the image information obtained by the photographing unit 100, sensing information sensed by the sensor unit 200, and the like.

The control unit 600 generally controls the functions of the network camera 10.

Further, the control unit 600 generally controls the functions of the network camera 10 using the programs and data stored, in the storage unit 400. The control unit 600 may include a RAM, a ROM, a CPU, a GPU, and buses, in which the RAM, ROM, CPU, and GPU can be mutually connected by the buses. The CPU can access the storage unit 400 and perform booting using an Q/S stored in the storage unit 400, and can implement various operations using various programs, contents, and data stored in the storage unit 400.

Further, the control unit 600 transmits the image information obtained by the photographing unit 100 to the server (or center) 30 through a wireless communication network.

Further, when the network camera 10 is turned on (or after booting is finished/in an operation state/in a stand-by state), the control unit 600 does not output a predetermined first alarm signal through a first digital output terminal 730 operated in a normally-closed state in the I/O unit 700 and does not output a predetermined second alarm signal through a second digital output terminal 740 operated in a normally-closed state in the I/O unit 700. Herein, the first alarm signal and the second alarm signal may be signals having predetermined magnitudes and sizes showing an on-state (or off-state).

In this case, when the network camera 10 is turned off (or in a power-off state/before booting is finished), the control unit 600 closes the first digital output terminal 730 and does not transmit the first alarm signal to the alarm panel 20 through the first digital output terminal 730.

Further, when the network camera 10 is turned off (or in a power-off state/before booting is finished), the control unit 600 opens the second digital output terminal 740 and transmits the second alarm signal to the alarm panel 20 through the second digital output terminal 740.

Accordingly, even in an event with power shut down, it is possible to easily remove difficulties In management of the network camera 10 by easily checking corresponding situations from the alarm panel 20.

Further, the control unit 600 checks (or determines) whether a person (or an object) has been sensed from, the image information obtained by the photographing unit 100.

As the result of checking (or determining), when there is no person sensed in the image information obtained by the photographing unit 100, the control unit 600 repeats the process of checking whether a person has been sensed on the basis of the image information continuously obtained by the photographing unit 100.

Further, as the result of checking (or determining), when there is a person sensed in the image information obtained by the photographing unit 100, the control unit 600 outputs the predetermined first alarm signal through the first digital output terminal 730 in the I/O unit 700.

That is, as the result of checking (or determining), when there is a person sensed in the image information obtained by the photographing unit 100, the control unit 600 outputs the first alarm signal through the first digital output terminal 730 for the first digital output terminal 730 operated in the normally-closed state.

Further, the control unit 600 determines (or checks) whether a predetermined event has been sensed by the sensor unit 200.

As the result of determining (or checking), when there is no predetermined event sensed by the sensor unit 200, the control unit 600 continuously repeats the process of determining whether a predetermined event has been sensed through the sensor unit 200. Herein, the predetermined event includes a case when there is a network loss, an SD card provided in the network camera is not recognized, the network camera 10 is operated for a predetermined/specific function, power for the network camera 10 is shut down, and the photographing unit 100 takes no image, and a case when the same image is acquired (or inputted) in the same way for a predetermined or more time by the photographing unit 100.

Further, as the result of checking (or determining), when there is a predetermined event sensed by the sensor unit 200, the control unit 600 outputs the predetermined second alarm signal through the second digital output terminal 740 in the I/O unit 700.

That is, as the result of checking (or determining), when there is a predetermined event sensed by the sensor unit 200, the control unit 600 outputs the second alarm signal through the second digital output terminal 740 for the second digital output terminal 740 operated, in the normally-closed state.

Figure 2:
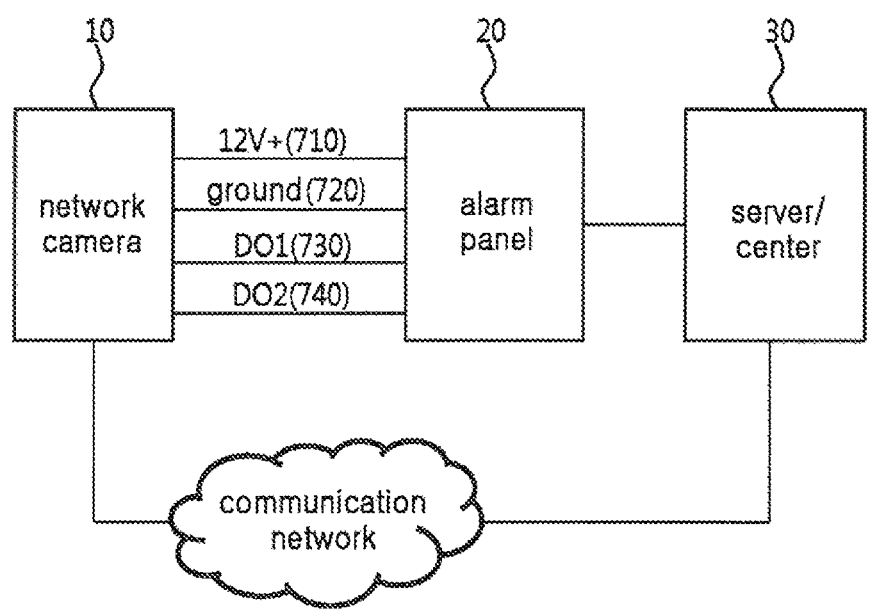
FIG. 2 is a diagram illustrating connection among an I/O unit, an alarm panel, and a server included in a network camera according to an embodiment of the present invention.

As illustrated in FIG. 2, the I/O unit 700 included in the network camera 10 includes a power terminal (or a power line) 710, a ground terminal (or a ground line) 720, a first digital output terminal (or a first digital output line) 730, and a second digital output terminal (or a second digital output line) 740.

In this case, the I/O unit 700 can be connected to the alarm panel 20 by a 4-wire cable that has been used for connection between a PIR sensor module and an alarm panel in the related art.

Accordingly, when the PIR sensor module is replaced with the network camera 10, when the common 4-wire cable in the related art is reused, and when the network camera 10 and the alarm panel 20 are newly connected, common 4-wire cables that are usually used can be used without change, so it is possible to reduce the costs. Further, it is possible to reduce the costs for training workers who install the network camera 10 and for managing the equipment at a remote place.

The first digital output terminal 730 operates in the normally-closed state only for an intrusion alarm in order to raise an alarm about a person (or an object) sensed (or checked) by the photographing unit 100.

Further, when the network camera 10 is turned off (or in an off-state/before booting is finished), the first digital output terminal 730 is controlled by the control unit 600 not to send out an alarm (or an alarm signal/a first alarm signal) to the alarm panel 20 in the closed state.

Further, when the network camera 10 is turned on (or after booting is finished/in an operation state/in a stand-by state), the first digital output terminal 730 is controlled by the control unit 600 not to send out an alarm (or an alarm signal/a first alarm signal) to the alarm panel 20 in the closed state.

Further, when there is a person sensed in the image information obtained by the photographing unit 100, the first digital output terminal 730 is controlled by the control unit 600 to output (transmit/provide) the first alarm signal to the alarm panel 20.

The second digital output terminal 740 operates in the normally-open state only for a trouble alarm in order to raise an alarm about a predetermined event sensed (or checked) by the sensor unit 200.

Further, when the network camera 10 is turned off (or in an off-state/before booting is finished), the second digital output terminal 740 is controlled by the control unit 600 to send out an alarm (or an alarm signal/a second alarm signal) to the alarm panel 20 in the open state.

Further, when the network camera 10 is turned on (or after booting is finished/in an operation state/in a stand-by state), the second digital output terminal 740 is controlled by the control unit 600 not to send out an alarm (or an alarm signal/a second alarm signal) to the alarm panel 20 in the closed state.

Further, when there is a predetermined event sensed by the sensor unit 200, the second digital output terminal 740 is controlled by the control unit 600 to output (transmit/provide) the second alarm signal to the alarm panel 20.

Herein, the alarm panel 20 determines whether to output an alarm signal about a sensed person (or an object/human body) on the basis of whether the first alarm signal transmitted from the network camera 10 through the first digital output terminal 730 has been received or not.

That is, when the first alarm signal is not transmitted to the alarm panel 20 through the first digital output terminal 730, the alarm panel 20 determines that there is no person sensed in the area where the corresponding network camera 10 is installed, and does not transmit an alarm signal (or the first alarm signal) to the server (or center) 30.

Further, when, the first alarm signal is transmitted to the alarm panel 20 through the first digital output terminal 730, the alarm panel 20 determines that there is a person sensed in the area where the corresponding network camera 10 is installed, and transmits (or outputs) an alarm signal (or the first alarm signal) to the server (or center) 30.

Further, the alarm panel 20 determines whether to output an alarm signal about a sensed predetermined event on the basis of whether the second alarm signal transmitted from the network camera 10 through the second digital output terminal 740 has been received or not.

That is, when the second alarm signal is not transmitted to the alarm panel 20 through the second digital output terminal 740, the alarm panel 20 determines that the corresponding network camera 10 normally operates, and does not transmit an alarm signal (or the second alarm signal) to the server (or center) 30.

Further, when the second alarm signal is transmitted to the alarm panel 20 through the second digital output terminal 740, the alarm panel 20 determines that there is a problem with the corresponding network camera 10, and transmits (or outputs) an alarm signal (or the second alarm signal) to the server (or center) 30.

As described above, the present invention may include a plurality of digital output terminals for transmitting image information obtained through a wireless communication network to a server and transmitting information about sensing a person and information about a problematic situation, respectively, using a 4-wire cable.

Further, as described above, it is possible to set the digital ground line of a 4-wire cable as a digital output line for outputting information about a problematic situation.

Hereafter, a method of controlling a network camera having a plurality of digital output terminals for outputting an alarm according to the present invention will be described in detail with reference to FIGS. 1 to 3.

Figure 3:
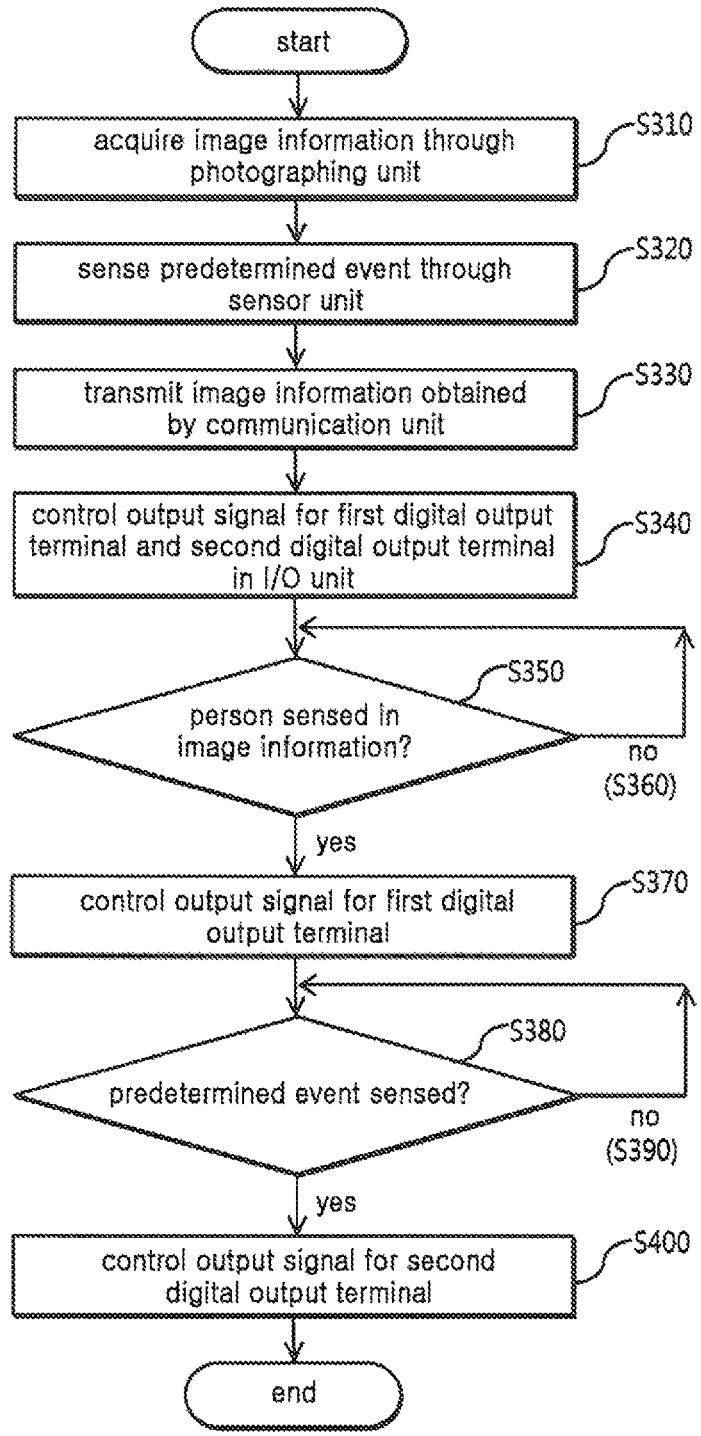
FIG. 3 is a flowchart illustrating a method of controlling a network, camera having a plurality of digital output terminals for outputting an alarm according to an embodiment of the present invention.

FIG. 3 is a flowchart illustrating a method of controlling a network camera having a plurality of digital output terminals for outputting an alarm according to an embodiment of the present invention.

First, the photographing unit 100 acquires (or photographs) image information about the area (or region) where the network camera 10 is installed.

For example, the first photographing unit 100 acquires the eleventh image information about the front door of a department store where the network camera 10 is installed (S310).

Thereafter, the sensor unit 200 senses predetermined events (or trouble events) including a case when there is a network loss, an SD card, provided in the network camera is not recognized, the network camera 10 is operated for a predetermined/specific function, power for the network camera 10 is shut down, and the photographing unit 100 takes no image, and a case when the same image is acquired (or inputted) in the same way for a predetermined or more time by the photographing unit 100.

For example, the first sensor unit 200 senses a predetermined first event including shut ting-off of power for the network camera 10 (S320).

Thereafter, the control unit 600 transmits the image information obtained by the photographing unit 100 to the server (or center) 30 through a wireless communication network. Herein, a wireless internet technology may be implemented by WLAN, DLNA, Wibro, Wimax, HSDPA, HSUPA, IEEE 802.16, LTE, LTE-A, WMBS, and the like. Further, a local communication technology may be achieved by Bluetooth, RFID, IrDA, UWB, Zigbee, NFC, USC, VLC, Wi-Fi, Wi-Fi direct, and the like.

For example, the control unit 600 transmits the eleventh image information obtained by the first photographing unit to the server 30 through Wi-Fi (S330).

Thereafter, when the network camera 10 is turned on (or after booting/in an operation state/in a stand-by state), the control unit 600 does not output a predetermined first alarm signal through the first digital output terminal 730 operated in a normally-closed state in the I/O unit 700 and does not output a predetermined second alarm signal through, the second digital output terminal 740 operated in a normally-closed state in the I/O unit 700. Herein, the first alarm signal and the second alarm signal may be signals having predetermined magnitudes and sizes showing an on-state (or off-state).

For example, when the network camera 10 that has been turned off is turned on (or when the network camera 10 that has been turned off is booted and finishes booting), the control unit 600 does not output a first alarm signal through the first digital, output terminal 730 in the I/O unit 700 and stops outputting a second alarm signal through the second digital output terminal 740 through which the second alarm signal has been outputted before, the booting (S340).

Thereafter, the control unit 600 checks (55 or determines) whether a person (or an object) has been sensed from the image information obtained by the photographing unit 100.

For example, the control unit 600 checks whether a person (or an object) has been sensed from the eleventh, image information obtained by the first photographing unit (S350).

As the result of checking (or determining), when there is no person sensed in the image information obtained by the photographing unit 100, the control unit 600 repeats the process of checking whether a person has been, sensed on the basis of the image information continuously obtained by the photographing unit 100.

For example, when there is no person (or an object) sensed in the eleventh image information obtained by the first photographing unit, the control unit 600 checks whether there is a person sensed in the twelfth image information obtained after the eleventh image information by the first photographing unit (S360).

Further, as the result, of checking (or determining), when, there is a person sensed in the image information obtained by the photographing unit 100, the control unit 600 outputs the predetermined first alarm signal through the first, digital output terminal 730 in the I/O unit 700.

For example, when there is a person (or an object) sensed in the eleventh image information obtained by the first photographing unit, the control unit 600 outputs a first alarm signal through the first digital output terminal 730 (S370).

Further, the control unit 600 determines (or checks) whether a predetermined event has been sensed by the sensor unit 200.

For example, the control unit 600 determines whether the predetermined first event, which includes shutting-off power for the network camera 10, has been sensed by the first sensor unit (S380).

As the result of determining (or checking), when there is no predetermined event sensed by the sensor unit 200, the control unit 600 continuously repeats the process of determining whether a predetermined event has been consistently sensed through the sensor unit 200. Herein, the predetermined event includes a case when there is a network loss, an SD card provided in the network camera is not recognized, the network camera 10 is operated for a predetermined/specific function, power for the network camera 10 is shut down, and the photographing unit 100 takes no image, and a case when the same image is acquired (or inputted) in the same way for a predetermined or more time by the photographing unit 100.

For example, when the predetermined first event including shutting-off power for the network camera 10 has not been sensed by the first sensor unit, the control unit 600 determines whether an event including shutting-off of power for the network camera 10 has been sensed by the first sensor unit (S390).

Further, as the result of determining (or checking), when there is a predetermined event sensed by the sensor unit 200, the control unit 600 outputs the predetermined second alarm signal through the second digital output terminal 740 in the I/O unit 700.

For example, when the predetermined first event including shutting-off of power for the network camera 10 has been sensed by the first sensing unit, the control unit 600 outputs a second alarm signal through the second digital output terminal 740 (S400).

Since an embodiment of the present invention, as described above, includes a plurality of digital output terminals for transmitting image information obtained through a wireless communication network to a server and transmitting information about sensing a person and information about a problematic situation, respectively, using a 4-wire cable, it is possible to reuse common 4-wire cables in the related art. Further, since it is possible to simultaneously sense a person and an event, according to a problematic situation from image information using one network camera, it is possible to reduce the costs and improve operation efficiency. Furthermore, it is possible to achieve the functions of common motion sensors in the related art without integrating an alarm panel with additional hardware/software using the same number as the total number of wires required for the common motion sensors, so workers who have installed the common motion sensors can install a camera without specific training.

Further, according to an embodiment of the present invention, as described above, the digital ground line of a 4-wire cable is set as a digital output line for outputting information about problematic situations, so it is possible to reduce the costs for training workers who install a camera and for managing the equipment at a remote place. Further, since the type of using four wires used for common motion sensors in the related art is available without a change, so it is possible to reduce the entry barrier to the alarm monitoring market of network cameras.

It should be understood that the present invention may be changed and modified by those skilled in the art without departing from the scope of the present invention. Accordingly, the embodiment described herein are provided not to limit, but to explain the spirit of the present invention and the spirit and the scope of the present invention are not limited by the embodiments. The protective range of the present disclosure should be construed on the basis of claims and all the technical spirits in the equivalent range should be construed as being included in the scope of the right of the present disclosure.

Since the present invention includes a plurality of digital output terminals for transmitting image information obtained through a wireless communication network to a server and transmitting information about sensing a person and information about a problematic situation, respectively, using a 4-wire cable, it is possible to check whether it is a normally-closed state or a normally-open state through the plurality of digital output terminals that are individually managed, and accordingly, it is possible to improve convenience in use. Therefore, the present invention can be used in various fields including a network camera field, an object, sensing field, an image field, and a server field.

What is claimed is:

1. A method of controlling a network camera having two digital output terminals for outputting an alarm to replace a PIR motion sensor, the method comprising:
   acquiring image information about an area where the network camera is installed, by means of a photographing unit operatively connected to a first digital output terminal;
   sensing a predetermined problematic event by means of a sensor unit operatively connected to a second digital output terminal;
   transmitting the image information obtained by the photographing unit to a server through a wireless communication network by means of a communication unit; and
   performing control, when the network camera is turned on, not to output a predetermined first alarm signal through the first digital output terminal operated in a normally-closed state in an I/O unit and not to output a predetermined second alarm signal through the second digital output terminal operated in a normally-closed state in the I/O unit, by means of a control unit,
   wherein the predetermined problematic event includes at least one of a case when there is a network loss, an SD card provided in the network camera is not recognized, the network camera is operated for predetermined functions, power for the network camera is shut down, and the photographing unit takes no image, and a case when the same image is acquired in the same way for a predetermined or more time by the photographing unit.

2. The method of claim 1, further comprising: checking whether there is a person sensed in the image information obtained by the photographing unit, by means of the control unit; and
   Controlling to output the predetermined first alarm signal through the first digital output terminal by means of the control unit when there is a person sensed in the image information obtained by the photographing unit, as the result of checking.

3. The method of claim 1, further comprising: determining whether the predetermined problematic event has been sensed by the sensor unit, by means of the control unit; and
   controlling to output the predetermined second alarm signal through the second digital output terminal by means of the control unit, when the predetermined problematic event has been sensed by the sensor unit, as the result of determining.

4. A network camera having two digital output terminals for outputting an alarm to replace a PIR motion sensor, the network camera comprising:
   a photographing unit operatively connected to a first digital output terminal for acquiring image information about an area where the network camera is installed;
   a sensor unit operatively connected to a second digital output terminal for sensing a predetermined problematic event;
   a communication unit transmitting the image information obtained by the photographing unit to a server through a wireless communication network;
   an I/O unit connected to a 4-wire cable and including a power terminal, a ground terminal, the first digital output terminal, and the second digital output terminal; and
   a control unit, when the network camera is turned on, performing control not to output a predetermined first alarm signal through the first digital output terminal operated in a normally-closed state and not to output a predetermined second alarm signal through the second digital output terminal operated in a normally-closed state in the I/O unit,
   wherein the predetermined problematic event includes at least one of a case when there is a network loss, an SD card provided in the network camera is not recognized, the network camera is operated for predetermined functions, power for the network camera is shut down, and the photographing unit takes no image, and a case when the same image is acquired in the same way for a predetermined or more time by the photographing unit.

5. The network camera of claim 4, wherein the first digital output terminal is controlled by the control unit to output the predetermined first alarm signal, when there is a person sensed in the image information obtained by the photographing unit.

6. The network camera of claim 4, wherein the second digital output terminal outputs the predetermined second alarm signal when the network camera is turned off, and is controlled to output the predetermined second alarm signal by the control of the control unit when the predetermined problematic event has been sensed by the sensor unit.

* * * * *